United States Patent
Arnady et al.

(10) Patent No.: US 9,684,689 B2
(45) Date of Patent: Jun. 20, 2017

(54) DISTRIBUTED PARALLEL PROCESSING SYSTEM HAVING JOBS PROCESSED BY NODES BASED ON AUTHENTICATION USING UNIQUE IDENTIFICATION OF DATA

(71) Applicant: CA, Inc., New York, NY (US)

(72) Inventors: Shashanka Arnady, Karnataka (IN); Anand Manvi, Karnataka (IN); Chetan Doddamani, Karnataka (IN)

(73) Assignee: CA, Inc., New York, NY (US)

( * ) Notice: Subject to any disclaimer, the term of this patent is extended or adjusted under 35 U.S.C. 154(b) by 8 days.

(21) Appl. No.: 14/612,802

(22) Filed: Feb. 3, 2015

(65) Prior Publication Data

US 2016/0224393 A1 Aug. 4, 2016

(51) Int. Cl.
*G06F 9/50* (2006.01)
*G06F 17/30* (2006.01)

(52) U.S. Cl.
CPC ...... *G06F 17/30377* (2013.01); *G06F 9/5027* (2013.01); *G06F 9/5016* (2013.01); *G06F 9/5083* (2013.01); *G06F 17/30312* (2013.01)

(58) Field of Classification Search
None
See application file for complete search history.

(56) References Cited

U.S. PATENT DOCUMENTS

| | | | | |
|---|---|---|---|---|
| 7,596,227 B2* | 9/2009 | Illowsky | ............... | G06F 1/3203 380/277 |
| 8,756,421 B2* | 6/2014 | Kameda | .................. | G06F 21/31 713/168 |
| 2006/0004746 A1* | 1/2006 | Angus | ............... | G06F 17/30563 |
| 2008/0140947 A1* | 6/2008 | Slik | ....................... | G06F 3/0605 711/154 |
| 2008/0263286 A1* | 10/2008 | Jeong | ................... | G06F 15/167 711/149 |
| 2008/0319966 A1* | 12/2008 | Hutchison | ......... | G06F 17/30545 |

(Continued)

FOREIGN PATENT DOCUMENTS

CA WO 2008125913 A2 * 10/2008 ........... G06F 3/0605

OTHER PUBLICATIONS

Oluwaseyi et al., Quick-and-Clean Extraction of Linked Data Entities from Microblogs, Sep. 2014, ACM, SEM '14, pp. 5-12.*
IBM, Method for Resilient Data Storage, 2004, IBM, pp. 1-4.*

*Primary Examiner* — Abu Ghaffari
(74) *Attorney, Agent, or Firm* — Vierra Magen Marcus LLP

(57) ABSTRACT

The system and method of the present disclosure relates to data stored in a common database of a network for parallel processing by multiple processors or processing centers. As consumers and business continue to generate more and more data, the amount of data being stored across networks and computing environments increases. To monitor and process increasingly large amounts of data, the system and method of the present disclosure utilizes the atomicity of certain databases and storage devices to efficiently identify and mark data for processing by a designated processor or processing center, such that the designated processor or processing center is responsible for processing the identified and marked data. Consequently, the system ensures that no two processors or processing centers are processing the same data at the same time without the use of schedulers, queues or other conventional techniques.

22 Claims, 12 Drawing Sheets

(56) References Cited

U.S. PATENT DOCUMENTS

| | | | | |
|---|---|---|---|---|
| 2010/0145774 | A1* | 6/2010 | Veshnyakov | G07C 13/00 705/12 |
| 2010/0192148 | A1* | 7/2010 | Chen | G06F 17/30339 718/1 |
| 2011/0179105 | A1* | 7/2011 | Lindsay | G06F 9/5061 709/203 |
| 2012/0096001 | A1* | 4/2012 | Zhou | G06F 17/30982 707/737 |
| 2013/0159021 | A1* | 6/2013 | Felsher | G06F 19/322 705/3 |
| 2014/0123299 | A1* | 5/2014 | Jung | G06F 17/30312 726/26 |
| 2014/0149356 | A1* | 5/2014 | Agarwal | G06F 17/30008 707/652 |
| 2014/0359044 | A1* | 12/2014 | Davis | H04L 45/60 709/213 |
| 2015/0088844 | A1* | 3/2015 | Stigsen | G06F 17/30312 707/703 |
| 2015/0134685 | A1* | 5/2015 | Sekharan | G06F 17/30557 707/758 |
| 2016/0179581 | A1* | 6/2016 | Soundararajan | G06F 9/5016 718/104 |

* cited by examiner

EMAIL RECORDS 600

| MSGID | EMAIL | EMAILID | RANDOM_VAL | STATUS |
|---|---|---|---|---|
| F732BC1 | (BLOB) | user1@forwardinc.ca | <NULL> | NEW |
| F732BC2 | (BLOB) | user2@forwardinc.ca | 67335BBE8BEC4BD88209AF1319 | IN_PROGRESS |
| F732BC3 | (BLOB) | user3@forwardinc.ca | FFFFFDSDFFFBD88209AF131925 | COMPLETE |
| F732BC4 | (BLOB) | user4@outboundinc.ca | <NULL> | NEW |

DISTRIBUTED PARALLEL PROCESSING SYSTEM HAVING JOBS PROCESSED BY NODES BASED ON AUTHENTICATION USING UNIQUE IDENTIFICATION OF DATA

BACKGROUND

With the increasing development of technology, larger amounts of data are being collected and stored for later extraction and processing. As data amounts grow, the ability to process such data into useful information becomes increasingly difficult. Large scale data processing in conventional parallel and distributed processing environments has been developed to include the distribution of data and analysis among multiple storage devices and processors to provide use of aggregated storage and increased processing power. However, these systems equally suffer from a variety of drawbacks that prevent efficient processing.

Conventional architectures and computing environments for a distributed system include, for example, servers configured to collect and locally store data in one or more databases. The ability to process the stored data may use, for example, a scheduler to manage and access data stored in each database. As the number of servers collecting and storing data continues to grow, it becomes increasingly difficult to coordinate proper communication between the servers. Thus, various replication and synchronization processes must be performed. If and once the data has been collected in a central location (e.g., common data source, such as a database), the data must then be stored in such a manner to be processed. Processing of the data conventionally includes techniques such as centralized schedulers to distribute data loads between processing devices, sticky distribution in which data is divided based on certain attributes that are used to distribute the data based on data characteristics, a master/slave architecture in which data is distributed from a master to the slave, and systems in which processing devices register with the system and are allocated data for processing based on work load distribution.

BRIEF SUMMARY

The present disclosure, generally described, relates to technology for distributing data stored in a common data source, and in particular, to distribution of data stored in a common data source of a network for parallel processing by multiple processors or processing centers.

More specifically, data is collected from various sources, including servers, and stored in a common data source. When the data (or subset of data) is retrieved for processing, a processor or processing entity associated with the subset of data generates a unique identifier and marks the subset of data for later identification. The marked subset of data (including the unique identifier) is saved in the common data source as an updated subset of data for later retrieval. While the marking is a unique, it does not identify any of the processors or processing entities that process the subset of data. Rather, the unique identifier is for the purpose of later comparing and matching the marking in the subset of data with the unique identifier generated by the processor or processing entity. Once a subset of data is retrieved and the comparison has been made, if the unique identifier in the marked subset of data equals the unique identifier in the updated subset of data the subset of data may be fetched for processing.

Since the data (or subset of data) is marked for processing by a specific processor or processing entity, the system and method of the disclosure is capable of exploiting the atomicity of certain databases to ensure that no two processors or processing entities process the same data (or subset of data) at the same time. In one embodiment, if a processor or processing entity is stalled or stops processing, another processor or processing center may begin processing the data after a threshold or trigger event is satisfied. For example, if a processor or processing entity stops, then after a determined period of time, another processor or processing entity will begin processing the data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures with like references indicating like elements.

FIG. 6A is an exemplary data table storing data for processing and distribution using the systems of FIGS. 1, 3 and 5.

DETAILED DESCRIPTION

The present disclosure, generally described, relates to technology for distributing data stored in a common data source, and in particular, to distribution of data and processes stored in a common data source in a distributed and parallel processing environment having multiple processors or processing entities. Data is collected from various sources, including servers, and stored in a common data source. When a processor or processing entity retrieves a subset of the data for processing, the processor or processing entity generates a unique identifier. The marked subset of data including the unique identifier is saved in the common data source as an updated subset of data for later retrieval. While the marking is a unique identifier, it does not identify any of the processors or processing entities. Rather, the unique identifier is for the purpose of later comparing and matching the marking in the subset of data with the unique identifier generated by the processor or processing entity. Once a subset of data is retrieved and the comparison has been made, if the unique identifier in the marked subset of data equals the unique identifier in the updated subset of data the subset of data may be fetched for processing. Additionally, marking the subset of data with the unique identifier prevents a processor or processing entity from processing the same subset of data as any other processor or processing entity until the processing is completed or the subset of data is released by the processor or processing entity.

Figure 1:
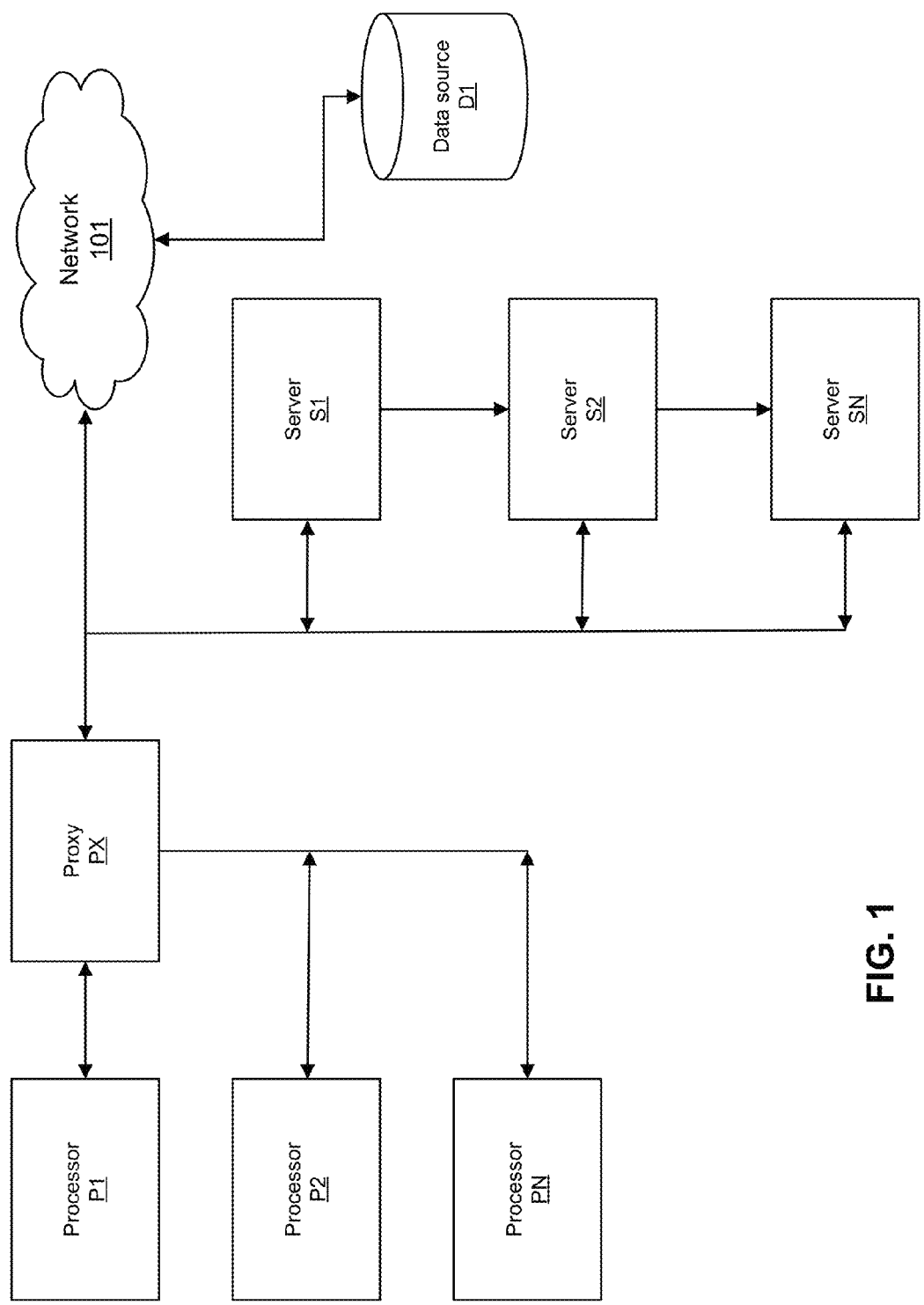
FIG. 1 is an exemplary block diagram of a system for processing data from a common data source.

FIG. 1 is an exemplary block diagram of a system for processing data stored in a common data source. As illustrated, the network system includes, but is not limited to, multiple processors P1, P2 to PN, such as a client computing device, each of which may be located in the same or different locations throughout the network; a proxy PX, such as an interface between the system components and the network; a data source D1, such as a database, storage system, memory or any component capable of supplying or storing data; and one or more servers S1, S2 to SN, such as email or data servers, where each system component is connected to the network 101. The data source D1 is responsible for storing data collected and acquired from one or more sources. For example, in the exemplary embodiment, the data source D1 collects data from one or more of servers S1-SN. The data be may in any form, and is not limited to data provided by servers S1-SN. As appreciated, data may be collected from any source connected to or capable of connecting to the network or any component on the network. Moreover, in the illustrated embodiment, the data source D1 is illustrated as a single or common storage system. However, the common storage system may comprise multiple data sources and/or data systems connected together to form a common data storage system. The data source D1, in addition or as an alternative to operating independently on the system, can be local to the processors P1-PN, one of the server computing devices S1-SN, the proxy PX, or any other system component (not illustrated). Additionally, and as discussed above, the data source D1 may be distributed among the processors, proxy and servers, and may be a central or common data storage device or comprise multiple devices connected over the network 101. In one exemplary embodiment, the data source D1 can store one or more sets or subsets of data obtained by the servers S1-SN for processing by the processors P1-PN. In one embodiment, the data source D1 is atomic. That is, the data source D1 may have write atomicity such that data currently being processed by one processor may not be processed by any other processor (explained in more detail below).

The data (and subsets of data) stored in the data source D1 can be retrieved for analysis and parallel processing by the processors P1-PN. The processors, which may be any type of processor or processing entity as readily appreciated by the skilled artisan, for example a computing device or warehouse of computing devices, are responsible for processing portions or subsets of data retrieved from the data source D1. As the system collects and stores large volumes of data, the processors P1-PN individually process, in parallel, a respective subset of data retrieved from the data source D1. In order to accomplish this task, the processors P1-PN should be able to identify respective subsets of data for processing. For example, the processors may generate a unique identifier (explained below) that provides the respective processor P1-PN with the ability to locate the respective subset of data stored in the data source D1 for processing. Since each processor P1-PN is able to process a subset (or subsets) of data having been uniquely identified, no other processor P1-PN will process the same subset (or subsets) of data at the same time. However, each of the other processors P1-PN will continue to process a respective subset (or subsets) of data in parallel with each of the other processors P1-PN. The unique identifier, along with the above described atomicity of the data source D1, ensures that no one set or subset of data is being processed by more than one processor at the same time.

Proxy PX provides an interface, for example between a server S1-SN (e.g., an email server) and a processor P1-PN (e.g., a client computing device), and the network 101. For example, proxy PX may be in the form of a firewall or computer hardware system and/or software system that interfaces with the servers S1-SN and processors P1-PN. It is appreciated that while a proxy PX is depicted in the illustrated embodiment, the system may also be implemented without use of the proxy. In one embodiment, the data stored in data source D1 can comprise a very large amount of data, such that the processing of such data can be prohibitively slow if performed by a single processor in which numerous processes are being analyzed. For example, if the data comprises several hundred terabytes of data, the processing of such data using a single processor would take an extraordinary amount of time to complete. In order to complete processing data of this size in a reasonable amount of time, multiple processors, each capable of analyzing and processing one or more processing jobs, can independently and in parallel process a portion or subset of the data stored in data source D1. An explanation of how the data is identified for processing by the different processors P1-PN is explained in detail below.

The servers S1-SN are configured to monitor one or more devices, such as routers, and collect data. For example, the servers S1-SN may collect data such as emails, videos, numerical data, quantitative data, qualitative data, or data of any kind. Data might also be input by a user in communication with the servers, and/or from applications, services, or programs running on the servers S1-SN. The servers S1-SN may be configured to collect data instantaneous and/or on a predetermined basis (e.g., every 5 minutes). Applications resident on the servers S1-SN, such as data source manager DM (FIG. 3), may instruct the servers S1-SN as to what data to collect, and how to transmit it to the data source D1. In one embodiment, the servers S1-SN may be email servers providing email messages to the data source D1. Additional details are provided below.

Figure 2:
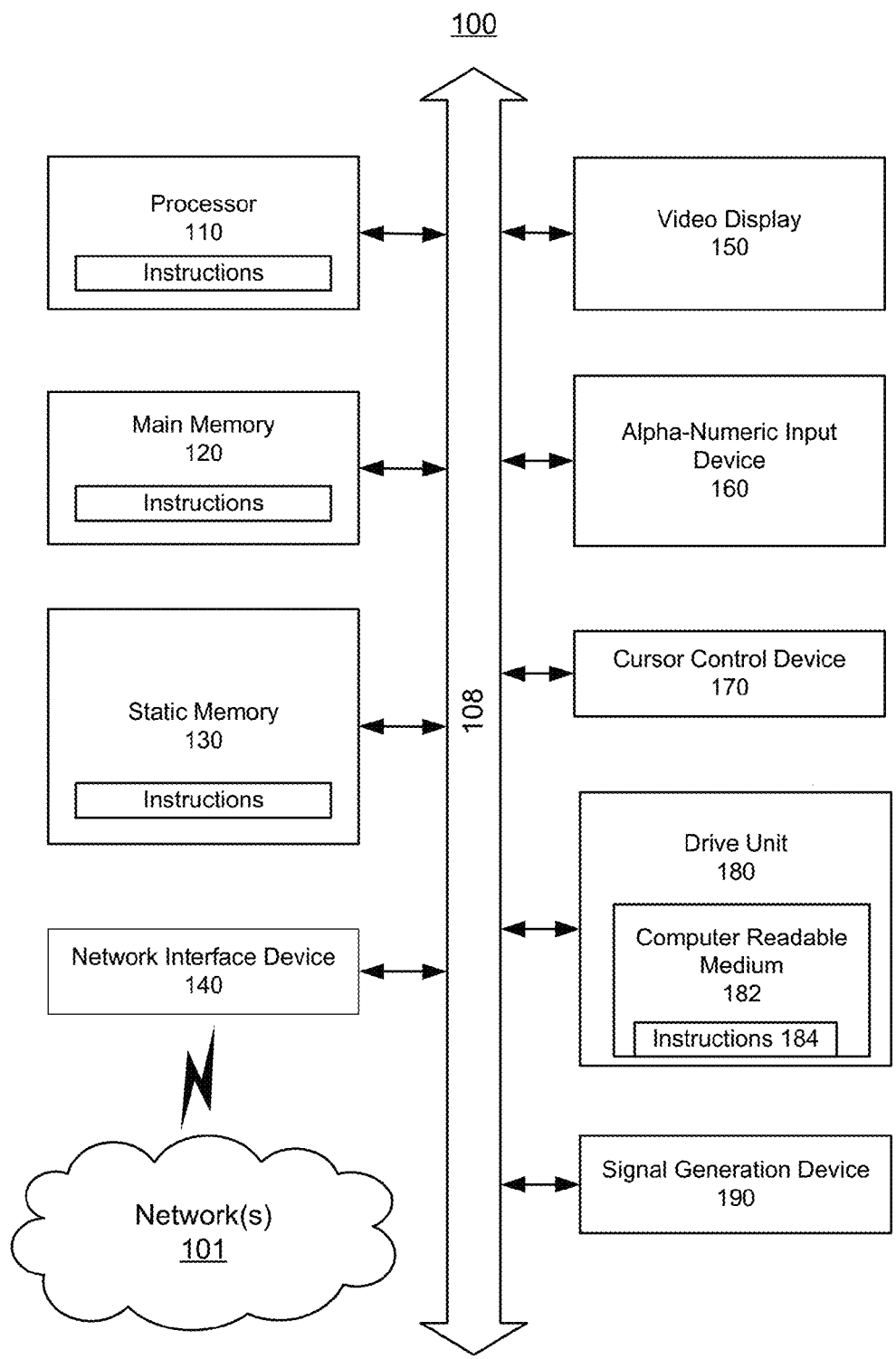
FIG. 2 shows an exemplary general computer system that may be used to implement the system depicted in FIG. 1.

FIG. 2 is an illustrative embodiment of a general computer system. The general computer system which is shown and is designated 100 may be used to implement the device illustrated in FIG. 1. The computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following:

a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In a networked deployment, the computer system 100 may operate in the capacity of a server or as a client user computer in a server-client user network environment, or as a peer computer system in a peer-to-peer (or distributed) network environment. The computer system 100 can also be implemented as or incorporated into various devices, such as an call interceptor, an IVR, a context manager, an enrichment sub-system, a message generator, a message distributor, a rule engine, an IVR server, an interface server, a record generator, a data interface, a filter/enhancer, a script engine, a PBX, stationary computer, a mobile computer, a personal computer (PC), a laptop computer, a tablet computer, a wireless smart phone, a personal digital assistant (PDA), a global positioning satellite (GPS) device, a communication device, a control system, a web appliance, a network router, switch or bridge, a web server, or any other machine capable of executing a set of instructions (sequential or otherwise) that specify actions to be taken by that machine. The computer system 100 can be incorporated as or in a particular device that in turn is in an integrated system that includes additional devices. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 2, the computer system 100 includes a processor 110. A processor for a computer system 100 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A processor is an article of manufacture and/or a machine component. A processor for a computer system 100 is configured to execute software instructions in order to perform functions as described in the various embodiments herein. A processor for a computer system 100 may be a general purpose processor or may be part of an application specific integrated circuit (ASIC). A processor for a computer system 100 may also be a microprocessor, a microcomputer, a processor chip, a controller, a microcontroller, a digital signal processor (DSP), a state machine, or a programmable logic device. A processor for a computer system 100 may also be a logical circuit, including a programmable gate array (PGA) such as a field programmable gate array (FPGA), or another type of circuit that includes discrete gate and/or transistor logic. A processor for a computer system 100 may be a central processing unit (CPU), a graphics processing unit (GPU), or both. Additionally, any processor described herein may include multiple processors, parallel processors, or both. Multiple processors may be included in, or coupled to, a single device or multiple devices.

Moreover, the computer system 100 includes a main memory 120 and a static memory 130 that can communicate with each, and processor 110, other via a bus 108. Memories described herein are tangible storage mediums that can store data and executable instructions, and are non-transitory during the time instructions are stored therein. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A memory describe herein is an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted.

As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard/virtual keyboard or touch-sensitive input screen or speech input with speech recognition, and a cursor control device 170, such as a mouse or touch-sensitive input screen or pad. The computer system 100 can also include a disk drive unit 180, a signal generation device 190, such as a speaker or remote control, and a network interface device 140.

In a particular embodiment, as depicted in FIG. 2, the disk drive unit 180 may include a computer-readable medium 182 in which one or more sets of instructions 184, e.g. software, can be embedded. Sets of instructions 184 can be read from the computer-readable medium 182. Further, the instructions 184, when executed by a processor, can be used to perform one or more of the methods and processes as described herein. In a particular embodiment, the instructions 184 may reside completely, or at least partially, within the main memory 120, the static memory 130, and/or within the processor 110 during execution by the computer system 100.

In an alternative embodiment, dedicated hardware implementations, such as application-specific integrated circuits (ASICs), programmable logic arrays and other hardware components, can be constructed to implement one or more of the methods described herein. One or more embodiments described herein may implement functions using two or more specific interconnected hardware modules or devices with related control and data signals that can be communicated between and through the modules. Accordingly, the present disclosure encompasses software, firmware, and hardware implementations. Nothing in the present application should be interpreted as being implemented or implementable solely with software and not hardware such as a tangible non-transitory processor and/or memory.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

Figure 3:
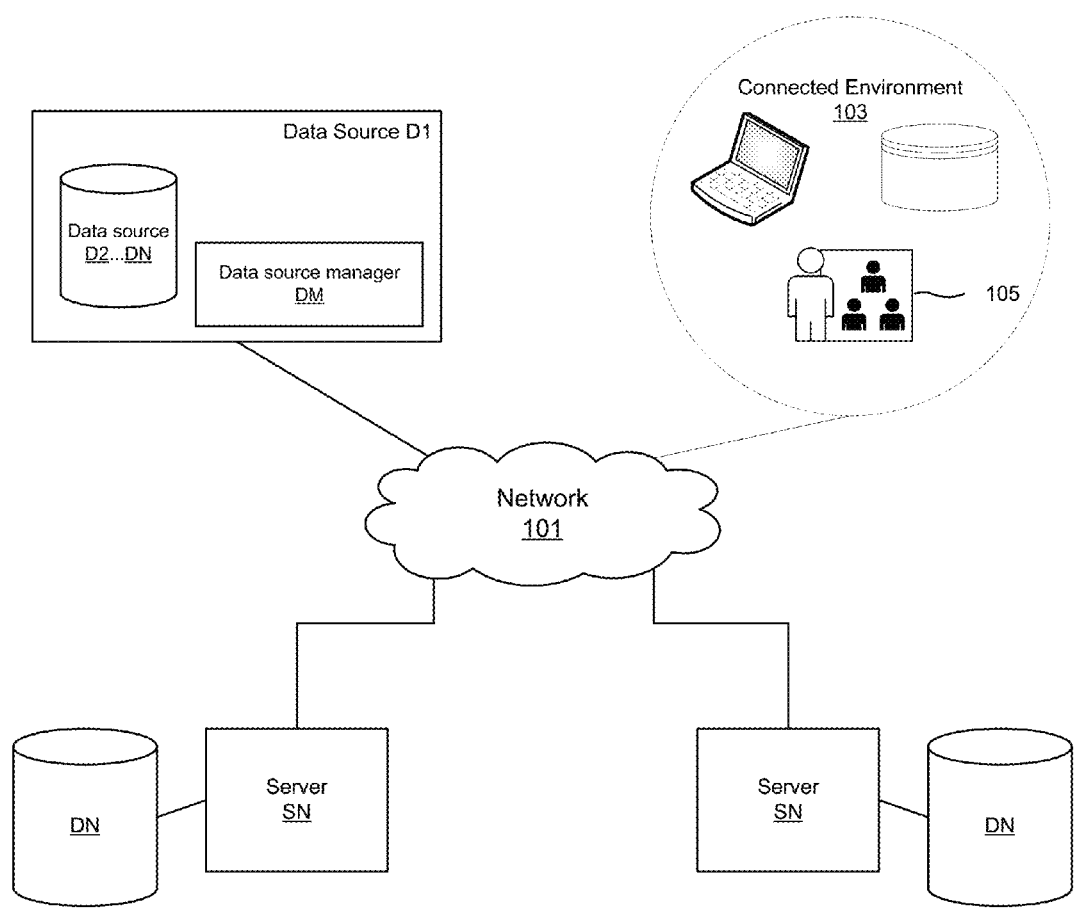
FIG. 3 is an exemplary system in which data is collected for processing and distribution.

FIG. 3 is an exemplary system in which data is collected and processed for distribution. The system in FIG. 3 details the servers SN and data sources D1-DN that are illustrated, for example, as servers S1-SN and data source D1 in FIG. 1. In the system depicted in FIG. 3, one or more servers SN are configured to collect data. For example, as explained above, the servers S1-SN may collect data such as emails, videos, numerical data, quantitative data, qualitative data, or data of any kind. Data might also be input by a user in communication with the servers, and/or from applications, services, or programs running on the servers S1-SN. The servers S1-SN may be configured to collect data instantaneous and/or on a predetermined basis (e.g., every 5 minutes). Applications resident on the servers S1-SN, such as data source manager DM, may instruct the servers S1-SN as to what data to collect, and how to transmit it to the data source D1. In one embodiment, the servers S1-SN may be email servers providing email messages to the data source D1. Instead of only storing collected data locally in respective data sources DN, each server SN may transmit data to a common data source D1 for storage in a common location. Data may be transmitted from one or more servers SN or other machines, for instance, in real-time, on a batch basis, and/or at predetermined or scheduled times. In addition, management of data collection for each of the servers SN may also be executed on common data source D1. This enables multiple servers SN to collect and transmit data to the common data source D1 using the same settings and/or according to the same schedule. For each sever SN in the system, a component or entity in the connected environment may identify the information that it monitors and the data it collects. For instance, a consumer or group of consumers 105 can select various data, such as, for example, monitoring and collecting data of a selected component, device, element, etc. by each server SN. In one exemplary embodiment, consumers 105 may elect to monitor and collect emails across a network for later processing. Storing groups and group lists on the common database D1 may make this information accessible from all machines in the system. The common data source D1 may include one or more machines or applications, such as data source manager DM and be configured to manage data in one or more data sources D2 . . . DN. The common source D1 may be configured to add, edit, and delete data stored therein, and is configured to process requests for information. Upon receipt of transferred data from the data sources DN (or other sources), the common data source D1 is configured to store all data that was transmitted from the servers SN. Of course, other data may be stored in common data source D1, as necessary. This may include any information that may be shared among the various machines of the system.

The common data source D1, as noted above, may be configured to run or operate a data source manager DM. Data source manager DM may include dedicated hardware, such as, an application specific integrated circuit (ASIC) or field programmable gate array (FPGA), software (firmware), or a combination of dedicated hardware and software. As software, for instance, the data source manager DM may be stored on a computer-readable or machine-readable storage media having computer-executable or machine-executable instructions executable by one or more processors. In some implementations, the data source manager DM may reside in a tangible memory device which may include, for example, any non-volatile electronic memory device (e.g., flash memory, EEPROM, etc.) or other memory device (e.g., disk drive, hard disk drive, writable optical disk, etc.) for storing electronic image data. In other implementations, the data source manager DM may be a stand-alone application running on a computer which interfaces with a printing system, for example, through a remote network connection, or via the computer- or machine-readable storage media, or a "plug-in" application that is incorporated into a third-party software application.

In the depicted embodiment, each of the system components are connected to and communicate through network 101 using any known protocol. The network can be any type of network, such as the Internet, intranet, extranet, WAN, LAN, etc. (as described above with reference to FIG. 2) or any combination thereof. For example, multiple servers SN which are configured to collect and locally store data in one or more databases DN are in communication with network 101. Similarly, data sources DN may be connected directly to the network 101 or locally at one of the multiple servers SN and coupled to the network 101 via the respective server SN. A connected environment 103, may also be connected to the network 101. The connected environment 103 may comprise, for example, networks, computers, servers, data sources, processing centers, mobile devices, consumers 105, etc. While the components are illustrated as connected through network 101, they may also connect to each other directly or through a common node or device connected to the network 101. It is appreciated that the networking environment depicted in the figure is not limited to the disclosed embodiment, and that other configurations as readily known may also be implemented.

Figure 4:
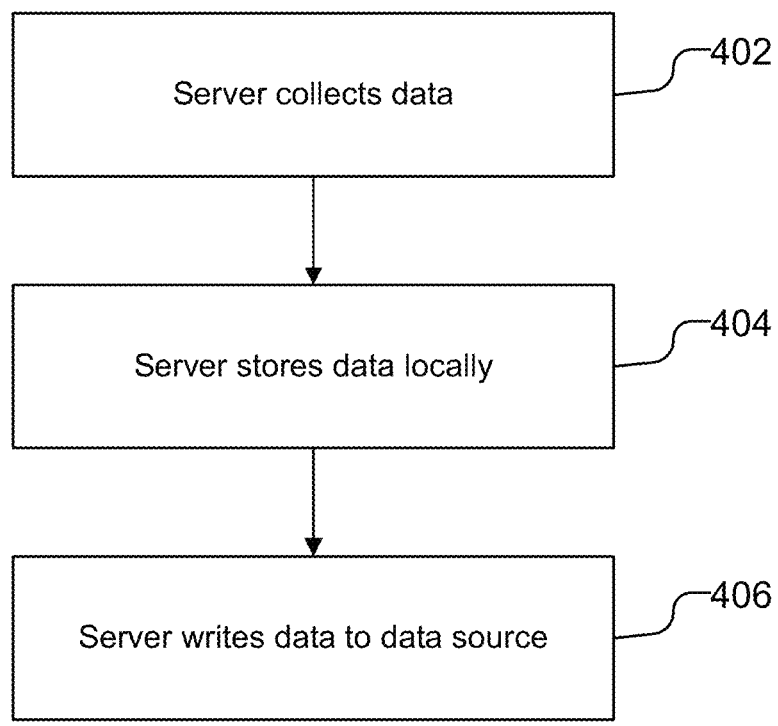
FIG. 4 is an exemplary flowchart showing the process for collecting processes for use in the system of FIGS. 1 and 3.

FIG. 4 illustrates an exemplary flowchart showing the process for collecting data for use in the system of FIGS. 1 and 3. The data source D1 may be populated with data, including various processing jobs, collected from a variety of sources and consistent with the description provided with respect to FIG. 3. Process 400 will be described with respect to a single server SN as the collector or provider of data. However, it is appreciated that the process may be performed by any machine (or more than one machine) connected on the system in a similar manner. For example, the process of FIG. 4 can be concurrently performed by all or a subset of the servers (e.g., S1, S2, SN, etc.). At 402, the server SN collects data such as emails, videos, numerical data, quantitative data, qualitative data, or data of any kind. Data might also be input by a user in communication with the servers, and/or from applications, services, or programs running on the servers S1-SN. The servers S1-SN may be configured to collect data instantaneous and/or on a predetermined basis (e.g., every 5 minutes). Applications resident on the servers S1-SN, such as data source manager DM, may instruct the servers S1-SN as to what data to collect, and how to transmit it to the data source D1. In one embodiment, the servers S1-SN may be email servers providing email messages to the data source D1. Data may also include processes or processing jobs which, as the terminology is used in this document, refers to any data that requires processing by the one or more of the processors or processing entities. For example, a process may be an instance of a computer program that is being executed by a processor or computing system, or multiple threads of execution that execute instructions concurrently using a processor or computing system. The data stored in the common data source D1 may be transmitted as collected, in real-time, or in a batched manner, for instance, at predetermined intervals, or at scheduled times. At 404, the server SN stores the collected data and processes locally and then sends the collected data and processes to the data source D1 for storage at 406. Accordingly, all data collected by the server(s) SN may be commonly stored in a common data source D1. It is appreciated that the disclosure is not limited to a single data source and may include, for example, multiple data sources connected together at a central location.

Figure 5:
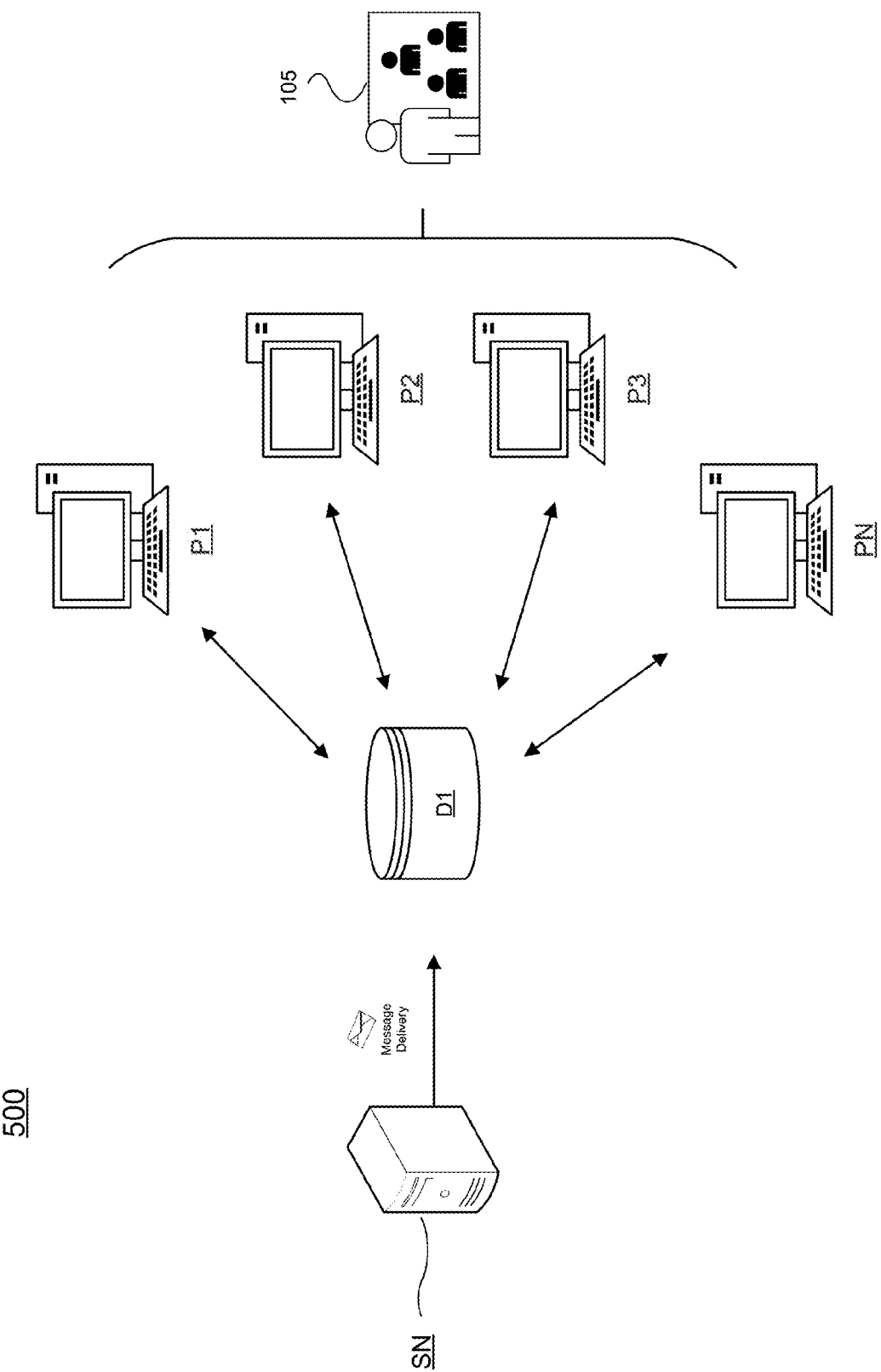
FIG. 5 is an exemplary system in which messages are collected by a server and stored in a common data source.

FIG. 5 is an exemplary system in which messages are collected by a server and stored in a common data source. Data that has been collected for distribution by the system of FIG. 3 using the process of FIG. 4 are processed using an exemplary system 500. In the exemplary embodiment of FIG. 5, the server SN is an email server that collects emails from a variety of sources (as described above) for storage in a common data source D1. For example, new emails are collected into the common data source D1 from server SN. The collected emails stored in common data source D1 may be distributed to processors P1-PN. In one embodiment, the emails may be encrypted prior to distribution to the processors P1-PN. Any standard encryption technique may be used to encrypt and secure the emails. As discussed above with reference to FIG. 1, the data stored in common data source D1 can become very large in volume. It therefore becomes increasingly difficult, as the amount of data (e.g., email) accumulates, to process the stored data in an efficient manner.

Processing of the stored data refers to one of the processors or processing entities P1-PN manipulating the data to produce a meaningful output by sorting, searching, validating, matching, aggregating, reporting, classifying, analyzing, summarizing, calculating, graphing, etc. For example, if a one of the processors PN is processing a subset of emails from the common data source D1, the processor may process the data to search for all emails received during a specified time period. Thus, several processors and/or processing entities P1-PN are required to process (in parallel), encrypt and ultimately send the emails to desired recipients, such as consumers 105 (described below). As explained above, processing the data in parallel allows for simultaneous processing by different processors or processing entities on a particular set or subset of data. However, in order to implement processing of emails in such a large volume, it becomes necessary to ensure that the emails (or set of emails) are not being processed in a duplicative manner. That is, the system 500 should ensure that the same emails are not processed by more than one of the processors or processing centers P1 to PN at the same time.

Consumers 105 may be individuals, a group of individuals, an organization or group of organizations, but are not limited thereto. While the consumers 105 are depicted in the connected environment 103, they may be in any location that is capable of communicating with the network 101, either directly or indirectly. The consumers 105, in one embodiment, may also be responsible for providing the type of data to be collected and stored in the data source D1, as well as the specific processing attributes (e.g., search variables, sorting techniques, etc.) to be performed on the data by the processors or processing entities P1-PN. Upon completion of processing the data, the processed data may be distributed to respective consumers 105 having requested the data be processed in a specific manner.

In order to accomplish data processing such that each set or subset of data is processed by a single processor or processing entity at the same time, the system 500 relies on the atomicity of the common data source D1 storing data. Atomicity requires that a series of database operations either all occur or do not occur at all. This atomicity prevents updates to a database occurring only partially or from being duplicated. Systems implement atomicity by providing a mechanism to indicate which of the data being processed have started and which have been completed. For example, if a processor P1 begins processing a first subset of data, there must be some mechanism to inform the system that the first subset of data is being processed by the processor P1. In one embodiment, the data (or subset of data) stored in the common data source D1 is marked with a unique identifier in order to implement such a mechanism. More specifically, when a processor (hereinafter, processor refers to a processor, processing entity, processing node, etc.) accesses a subset of data from the common data source D1, a unique identifier is generated by the processor to mark the subset of data for later retrieval. The unique identifier may be, for example, any random value that has been generated by the processor. Marking data in such a manner allows the system to identify when data is being processed, and thus, inaccessible by another processor, as explained further below. In another embodiment, the data (or subset of data) is marked with a random value and status information. The status information supplements the unique identifier and/or random value by providing the status of data being processed. For example, if data is being processed, the status information may indicate "IN PROGRESS". If processing of the data has been completed, the status information may indicate "COMPLETED". As noted, marking specific data or subsets of data to be processed by a corresponding one of the processors P1-PN provides the system with a mechanism to later retrieve or access the same data without allowing another processor P1-PN to gain retrieve or gain access to the same marked data. Thus, for example, only one of processors P1-PN may access the same data from the common data source D1 at the same time for processing. Although a specific processor P1-PN is assigned to process a corresponding subset of data, in the event the specific processor P1-PN fails or can no longer continue with processing, another of the processors P1-PN may be assigned to the subset of data to continue or complete processing. In any event, the processed data may then be sent to the consumer 105 having originally requested the processing. The processed data may be delivered directly from the processor P1-PN, or from a server SN. The consumer 105 may also directly request or access the data from data source D1.

In one embodiment, in addition or as an alternative to the unique identifier, random value and status information, data attributes may be assigned to a specific processor P1-PN that is indicative of the types of data that are to be processed by a designated processor P1-PN. For example, a particular processor PN may specialize in analysis of emails. In this case, the processor PN may have an attribute that identifies the process as specializing in email analysis. Thus, when email data requires processing, the system will be able to identify the processor PN and direct the email data for processing thereto.

In one exemplary embodiment, data is stored in common data source D1 as a data table. FIG. 6A is an exemplary data table that may be stored in a data source for processing. The exemplary data table 600 in FIG. 6 discloses storing data for processing and distribution using the system, for example, of FIG. 5. In the exemplary embodiment, the data table 600 shows a list of email records including, for example, a message identifier (MSGID), an email (EMAIL), and an email identifier (EMAILID). Additionally, the data table 600 shows a random value (RANDOM_VAL) and status information (STATUS) as data added to each row of an email (600A). Although the data illustrated in the exemplary embodiment is email, it is appreciated that any type of data may be stored in the data table 600. Similarly, the added data may include any type of data and is not limited to a random value and status identifier. Moreover, data may be stored in any format as understood by the skilled artisan, and is not limited to a table format.

In the disclosed embodiment, the random value and status information are added as part of marking a row in the data table 600 to indicate that the row is associated with a designated processor P1-PN (FIG. 5). In the example illustrated, the first three rows of message identifiers F732BC1, F732BC2 and F732BC3 have been identified for processing by a first of processors P1-PN, and the fourth row of message identifiers F732BC4 has been identified for processing by a second of processors P1-PN. That is, data has been "marked" at the end of each row that identifies each of the emails (data). These identifiers are used to designate which of the processors P1-PN will process the particular email or set of emails. Accordingly, in this example, the first three rows (first set of emails) are marked for processing by the first processor P1, and the fourth row (second set of emails) is marked for processing by the second processor P2. In the illustrated table, only a single email is depicted per row for ease of description. It is also appreciated that the data table 600 is illustrated in a simplistic manner for ease of discussion. However, as noted above, the data being processed includes very large amounts of data and is not limited to the disclosed embodiments.

More specifically, in the illustrated embodiment, marking of data includes the addition of a random value and status information to data table 600, as denoted by the two columns identified as 600A in FIG. 6A. Although the added data in data table 600 is shown as a random value and status information, any type of information may be added to the data table 600 to identify a row of data. Thus, the added data is not limited to those depicted. Initially, the random value generated by the associated processor PN will generate a default value of "NULL", and the status information is generated with a default value of "NEW", as illustrated in the first and fourth rows of the added data 600A. In this example, the added data "NULL" and "NEW" constitute an initial marking for the first and fourth rows of data in data table 600. As explained, the first row of data (and the second and third rows) has been associated with processor P1, and the fourth row of data has been associated with processor P2. Once a set (or subset) of data is marked with the initial values, no other processor P1-PN may update the data in those cells (rows) at the same time (see, FIG. 10). The marked data in the respective rows is then accessed or fetched by the same processor P1 for processing. When processing, the processor P1 generates a new random value (as an added measure of security) and updates the random value column with the newly generated random value (e.g., from "NULL" to "67335BBE8BEC4BD88209AF1319"). Additionally, the processor P1 updates the status information to reflect that processing as "IN_PROGRESS" instead of "NEW". Upon completion of the processing, processor P1 generates another random value and updates the random value column with the newly generated random value (e.g., "FFFFFDSDFFFBD88209AF131925"). The status information is also updated to reflect "COMPLETION" of processing by processor P1. Similarly, the set (or subset) of data for processor P2 is processed in parallel with the processing of the set (or subset) of data for processor or P1, although the details of such processing are not repeated. The process implemented on, for example system 500, is described in more detail below with reference to FIG. 8.

Figure 6B:
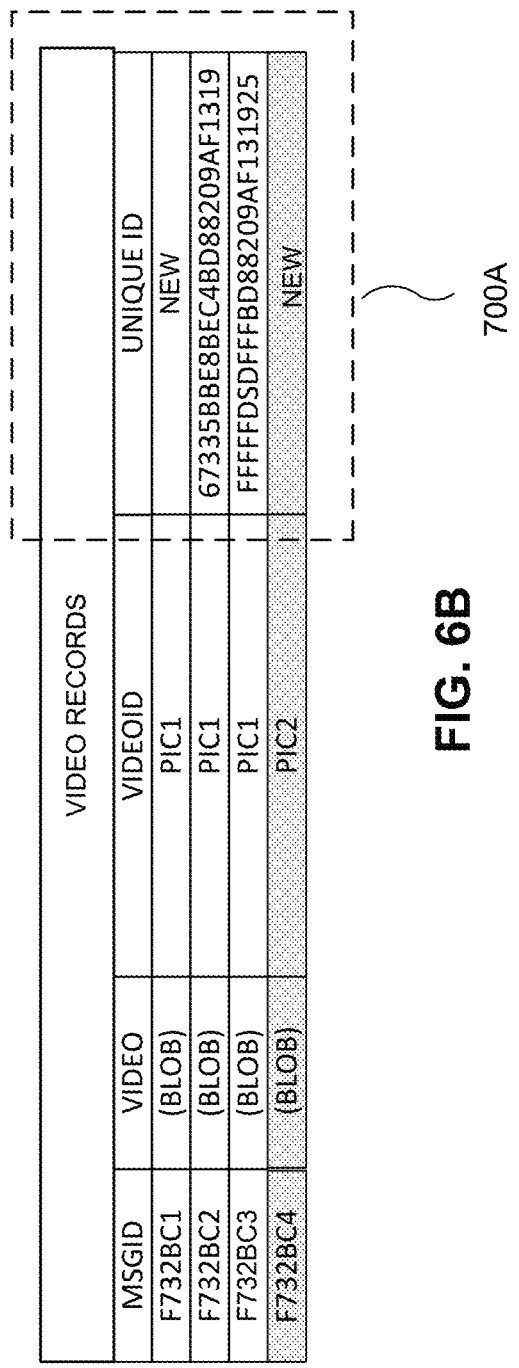
FIG. 6B is an exemplary data table storing data for processing and distribution using the systems of FIGS. 1, 3 and 5.

In another exemplary embodiment, data is stored in common data source D1 as a data table. FIG. 6B is an exemplary data table that may be stored in a data source for processing, similar to FIG. 6A. The exemplary data table 605 in FIG. 6B discloses storing data for processing and distribution using the system, for example, of FIG. 5. In the exemplary embodiment, the data table 605 shows a list of video records including, for example, a message identifier (MSGID), an video (VIDEO), and video identifier (VIDEOID). Different from the embodiment in FIG. 6A, the data table 605 shows a unique identifier (Unique ID) as data added to each row of an email (700A). Although the data illustrated in the exemplary embodiment is video data, it is appreciated that any type of data may be stored in the data table 605. Similarly, the added data may include any type of data and is not limited to a unique identifier. The unique identifier may be, for example, a random value generated by one of the processors P1-PN. Moreover, data may be stored in any format as understood by the skilled artisan, and is not limited to a table format. In the illustrated embodiment, marking of data includes the addition of a random value as the unique identifier to data table 605, as denoted by the final column identified as 700A in FIG. 6B. Although the added data in data table 605 is shown as a random value, any type of information may be added to the data table 605 to identify a row of data. Thus, the added information is not limited to those depicted.

Figure 7:
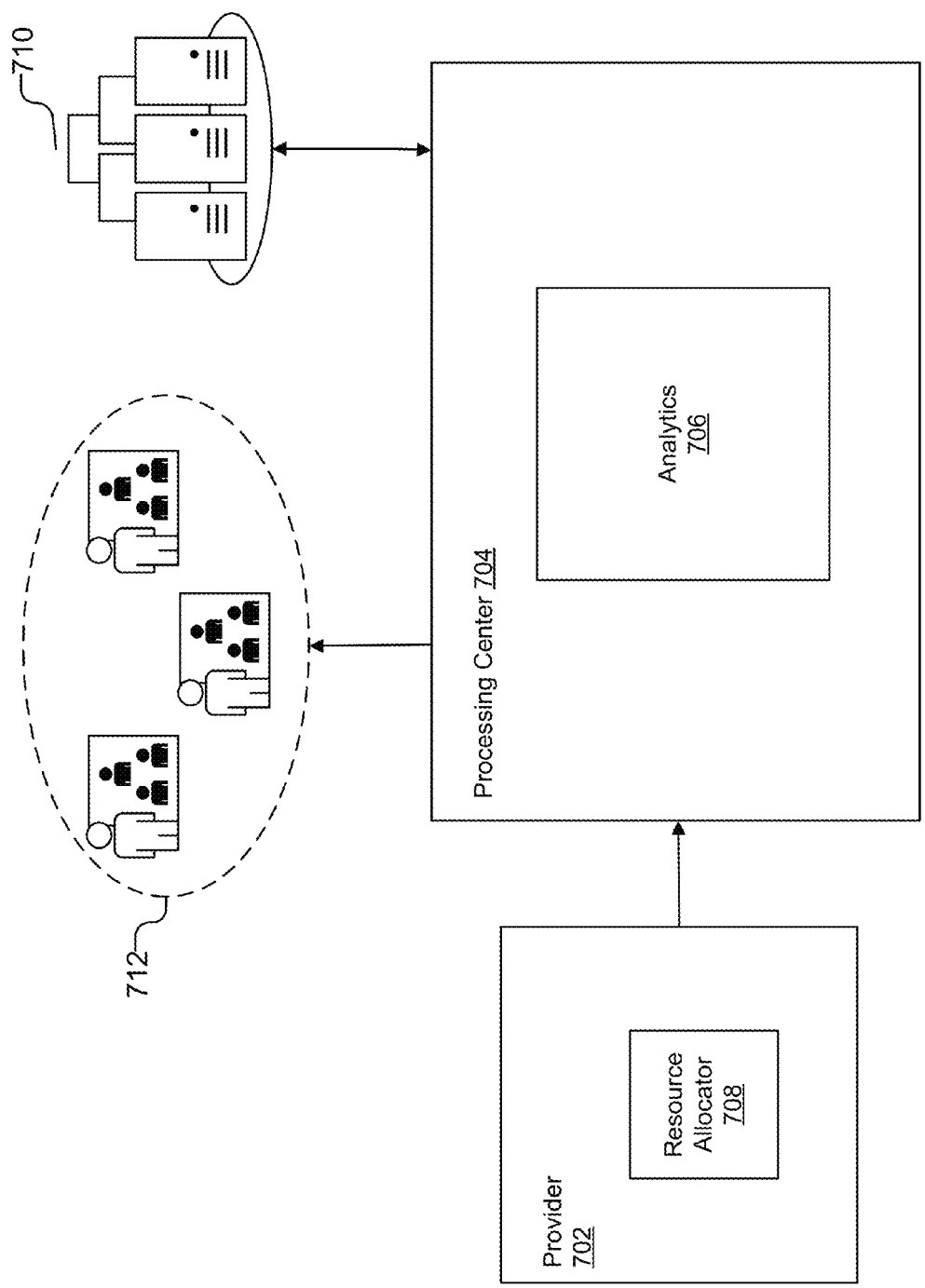
FIG. 7 is an exemplary system in which data is processed for distribution using analytics.

Initially, the random value generated by the associated processor PN will generate a default value of "NEW". Since no column representing the status of data processing exists (e.g., there is no status information column as described with reference to FIG. 6A), the unique identifier itself may provide the status of the data. For example, the first couple of bits of the generated number may be designated as providing an indication of the status, such as "NULL". In this example, the added data "NULL" constitutes an initial marking for the first and fourth rows of data in data table 605. The first row of data (and the second and third rows) has been associated with processor P1, and the fourth row of data has been associated with processor P2. Once a set (or subset) of data is marked with the initial values, no other processor P1-PN may update the data in those cells (rows) at the same time (see, FIG. 10). The marked data in the respective rows is then accessed or fetched by the same processor P1 for processing. At this time, the processor P1 generates a new unique identifier (as an added measure of security) and updates the unique ID column with a newly generated random value (e.g., from "NEW" to "67335BBE8BEC4BD88209AF1319"). Additionally, the processor P1 updates the first couple of bits to reflect that processing as "IN_PROGRESS" instead of "NEW". Upon completion of the processing, processor P1 generates another random value and updates the unique ID column with the newly generated random value (e.g., "FFFFFDSDFFFBD88209AF131925"). The first couple of bits in the random value is also updated to reflect "COMPLETION" of processing by processor P1. Similarly, the set (or subset) of data for processor P2 is processed in parallel with the processing of the set (or subset) of data for processor or P1, although the details of such processing are not repeated. The process implemented on, for example system 500, is described in more detail below with reference to FIG. 8. FIG. 7 is an exemplary illustration of a system with a processing center including analytics for processing. The processing center 704 (similar to, for example, processors P1-PN described above in FIGS. 1, 3 and 5) includes analytics 706 that processes the data described, for example, with reference to FIGS. 6A and 6B and the flowchart illustrated in FIG. 8 (described below). As illustrated in the exemplary embodiment, the system includes a provider 702 (similar to, for example, servers S1-SN described above in FIGS. 1, 3 and 5), a processing center 704, analytics 706, a resource allocator 708, data source 710 (similar to, for example, data sources D1-DN described above in FIGS. 1, 3 and 5) and consumers 712 (similar to, for example, consumers 105 described above in FIGS. 1, 3 and 5). The processing center 704 may include one or more entities including, but not limited to, a device, such as a personal computer, a personal digital assistant (PDA), a laptop, or another type of computation or communication device. The provider 702 may be, for example, any collector or provider of data, such as the server SN described with reference to FIGS. 1, 3 and 5. However, it is appreciated that a collector or provider is not limited to servers, and may be any device capable of collecting and providing information. The processing center 704 may also include, but is not limited to, any type of processor or processing device capable of performing parallel processing. It is appreciated that the terms parallel processing or parallel processing center, as used in this document, should be broadly interpreted to include any environment or device capable of performing parallel processing. For example, a parallel processing center may include a dynamic number of processes provided on one or more hardware, software, and/or a combination of hardware and software modules of execution which may have several different control and data passing layers through which a current behavior of a part or a whole of the environment may be specified.

Analytics 706, as part of the processing center 704, may include hardware, software, and/or a combination of hardware and software based logic that analyzes the data and processes provided by provider 702. In one implementation, analytics 706 is responsible for processing data provided by provider 702 and resource allocator 708. As described in the figures that follow, analytics 706 may generate a unique identifier, random values and status information, identify and mark data for processing by a particular process, and fetch data for processing by the designated processor. Further details of the analytics 706 is described below with respect to FIGS. 8 and 9. Resource allocator 708, as part of the provider 702, may also include hardware, software, and/or a combination of hardware and software based logic that allocates data and processes to one or more processors PN (FIG. 1) or processing centers 704 for parallel execution. The resource allocator 708 in one embodiment is responsible for distributing the data to a specific processor PN or processing center 704 (or group of processors and processing centers). For example, the resource allocator 708 distributes data to the various processors and processing centers 704 (and processors P1-PN) based on the marked data stored in the data source D1. In one embodiment, the distribution of data may be based on a processor or processing center's association with the type of data to be analyzed, the capability of the processor or processing center to analyze the data, etc. However, it is appreciated that the allocation and distribution of data may be based on any factor set by the system, as understood by the skilled artisan.

Figure 8:
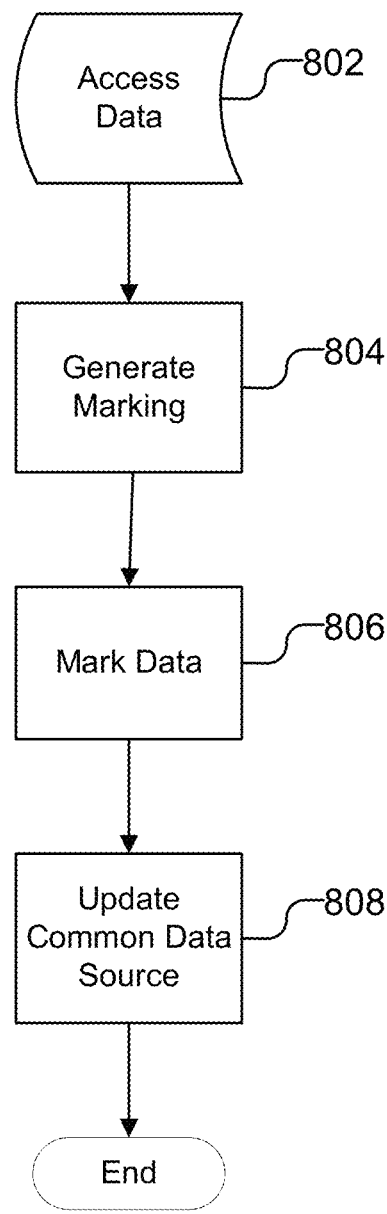
FIG. 8 is an exemplary flowchart illustrating the process flow implemented on the systems of FIGS. 1, 3 and 5.

FIG. 8 is an exemplary flowchart illustrating the process flow implemented on the described systems of FIGS. 1, 3 and 5. As discussed above with reference to FIGS. 3 and 4, data is collected by servers S1-SN, and the data is forwarded for storage in a common data source D1, such as a database. At 802, processors P1-PN access the data (or a subset of data) stored in the common data source D1 for processing. Prior to processing data, a processor, such as processor P1, marks the accessed data by generating a marking at 804. More specifically, the processor generates an initial marking, such as a unique identifier, random value or status identifier. The initial marking is set, for example, as "NULL" and/or "NEW". The accessed data is marked with the initial unique identifier, random value and/or status identifier at 806 (see, for example, data table 600 and marked data 600A (random value and status identifier) in FIG. 6A, and data table 700 and marked data 700A (unique identifier)). Once the data is initially marked with the initial marking, the marked data is provided to the common data source D1 and updated to reflect the marking added to the data, at 808. It is appreciated that the process flow described above is equally applicable to mark and update data after the initial marking has been generated and added to the data. Accordingly, the process will not be repeated. Marking and updating processes are described below.

Figure 9:
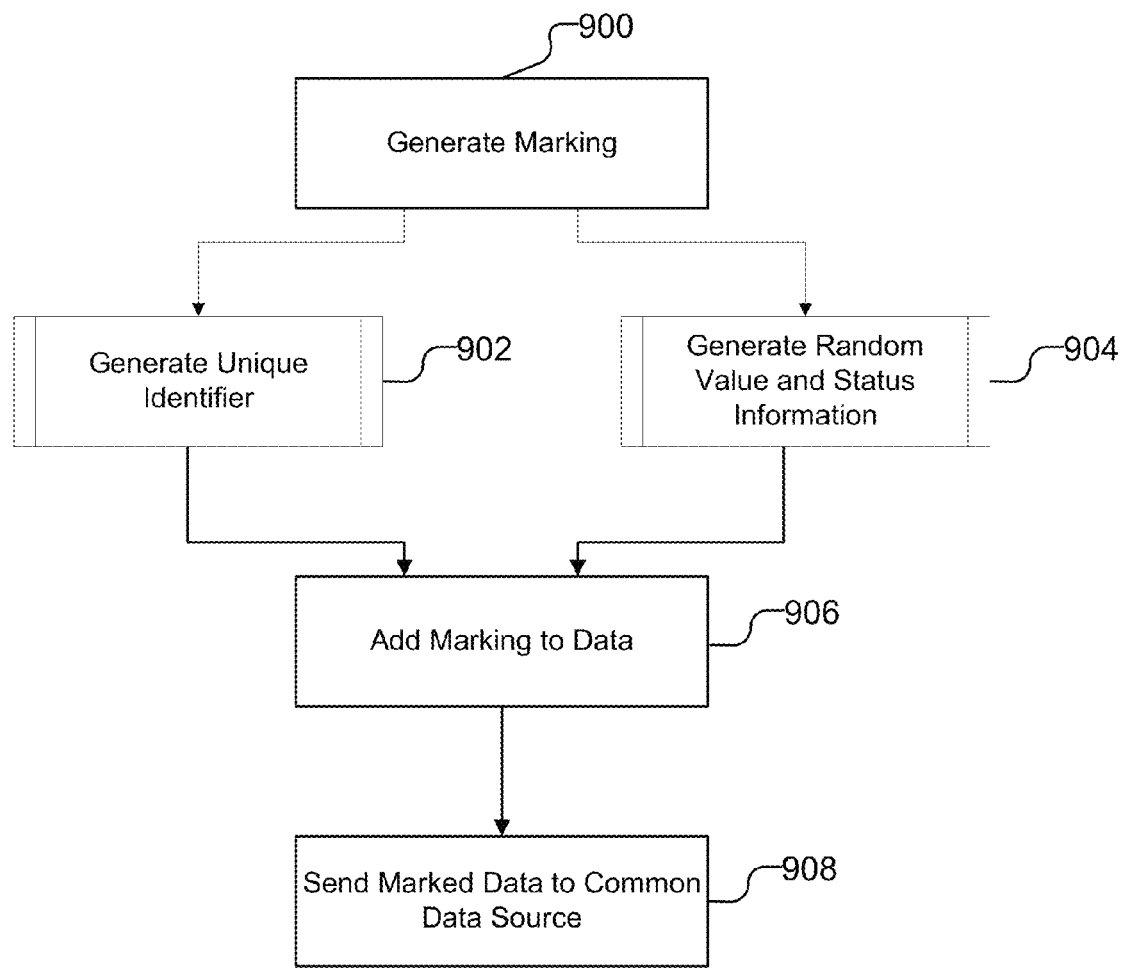
FIG. 9 is an exemplary flow chart of generating a marking as described as part of the process flow in FIG. 8.

FIG. 9 is an exemplary flow chart of generating a marking as described as part of the process flow in FIG. 8. Upon accessing data from the common data source D1, the processor PN generates a marking at 900. In the embodiments that follow, the accessed data has already been marked with the initial marking, as described with respect to FIG. 8, and updated in the common data source D1. In one embodiment, the marking is generated as a unique identifier in which the processor PN generates a random value having a flag or set number of bits provided to identify a status of the data, as described above, at 902. For example, a random value of "67335BBE8BEC4BD88209AF1319" (FIG. 6B) may be generated as the unique identifier, in which the first two bits of the number may indicate the status (e.g., IN PROGRESS, COMPLETED, etc.) of the data. In another embodiment, the marking is generated as a random value and status identifier by the processor PN at 904. For example, a random value of "67335BBE8BEC4BD88209AF1319" and a status indicator of "IN_PROGRESS" (FIG. 6A) may be generated. After the processor PN has generated the marking, it is added to the data accessed from the data source D1 at 906. For example, FIG. 6A shows marking 600A added to the data (MSGID, EMAIL, EMAILID) in data table 600, and FIG. 6B shows marking 700A added to the data (MSGID, VIDEO, VIDEOID) in data table 605. The marked data is then sent to the common data source D1 at 908 such that the accessed data is updated to reflect the marking added to the data. The updated data including the marking may then be used by the processors P1-PN to later identify the updated data for retrieval and continued processing, while ensuring that no other processor P1-PN will process the same data at the same time.

The following embodiment describes another embodiment of updating the common data source D1 to reflect markings generated by a processor PN. The embodiment will be described using a random value and status identifier, but may equally be applied to the unique identifier or any other type of identifier used to mark the data. The processor PN generates at 900 an updated random value and status identifier (904) by executing the following query:
UPDATE EmailRecords SET Random_Val=<RandNum>, Status=IN_PROGRESS WHERE Random_Val IS NULL AND Status=NEW.

Execution of the query updates the common data source D1 to reflect that the data (e.g., email records in this example) are now in the process of being processed (status="IN PROGRESS"). Additionally, the common data source D1 is updated to include the newly generated random value, at 904. As described above, the generated random value and status identifier are added to the data as a marking at 906. Upon completion of the update, the marked data is sent to the common data source D1. When the processor PN later retrieves data for processing (for example, detailed in FIG. 10), the following query is executed:
SELECT * FROM Email Records WHERE Random_Val=<RandNum>AND Status=IN_PROGRESS.

The above query fetches the data (in this example, email from the email records) from the common data source D1, such that the random value in the marked data is equivalent to the random value generated by the processor or processing center P1, as well as the status identifier indicating that processing is "IN_PROGRESS". As explained in more detail below (FIG. 11), the "select" (identify (912)) query ensures data in which the previously generated random value by the processor matches the random value of the marked data being fetched (914). Matching ensures that the processor PN processes the data and will not be fetched by any other during processing (with the exceptions previously discussed). At 918, if the processor PN has completed processing, then the process ends at 920 and the following query is executed to update the common data source D1:
UPDATE EmailRecords SET Status=COMPLETE WHERE Random_Val=<RandNum> AND Status=IN_PROGRESS.

Execution of the above "update" query (808, FIG. 8) indicates that processing of the data is finished (status="COMPLETED"), and the data is relinquished back to the common data source D1, such that other processors PN may now access the data for additional processing, if required. If processing has not been completed, then processing is repeated until such time processing has been completed. It is appreciated that although the described embodiments generally reference generation of a random number and status indicator, any form of data may be added as a marking to the data stored in the common data source that provides an indication of which processor will process the data, and that the instant disclosure is not limited to the described embodiments. Likewise, the stored data are not limited to those described in the instant disclosure, but may constitute any form of data. Thus, for example, the data and processes described herein are not limited to email or email messages.

Figure 10:
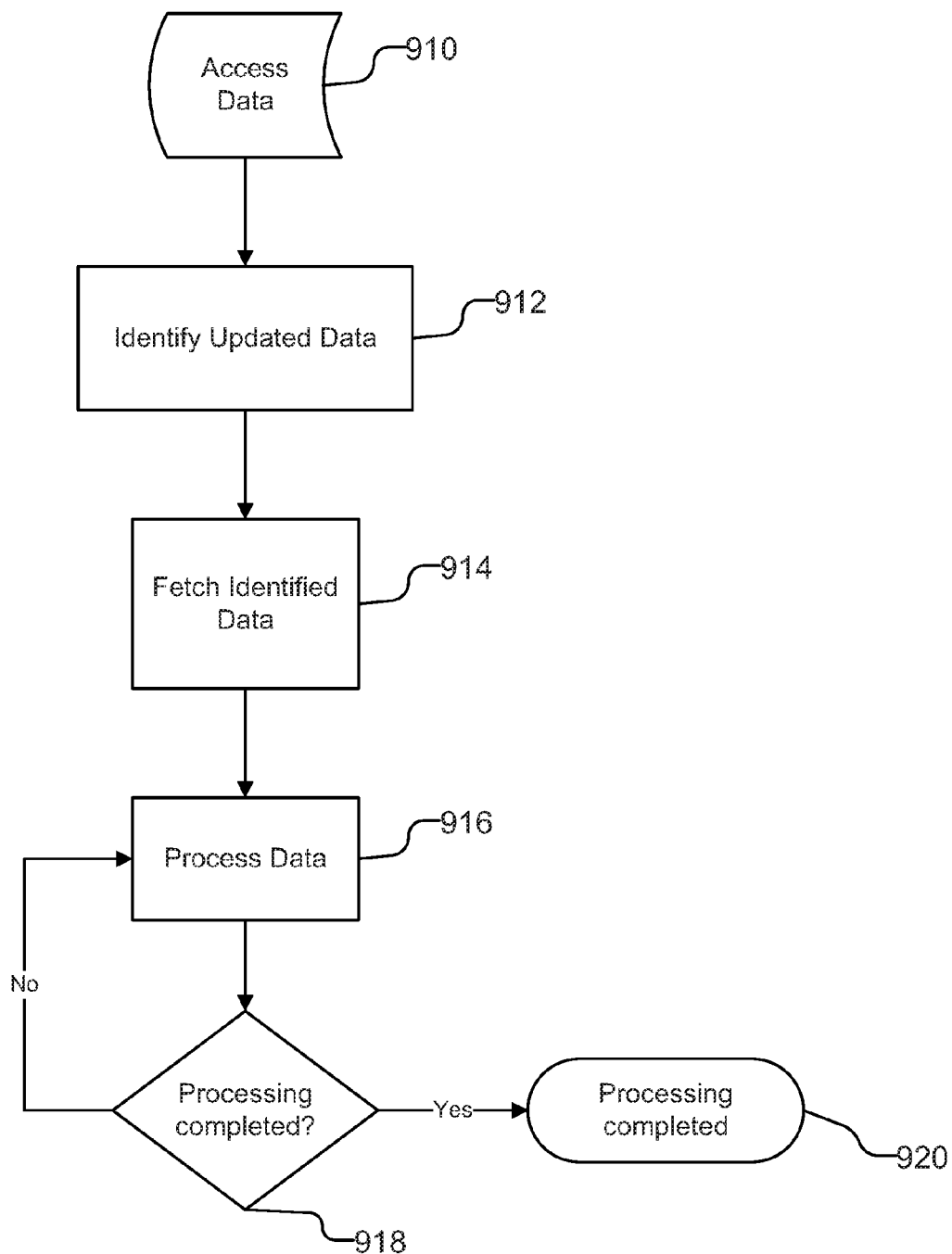
FIG. 10 is an exemplary flowchart of identifying and fetching data stored in the common data source.

FIG. 10 is an exemplary flowchart of identifying and fetching data stored in the common data source. In 910, a processor PN accesses data stored in the common data source D1 for processing. Prior to processing the stored data, the processor PN identifies data (data that has been updated in the common data source after having been marked by a respective processor) in the common data source D1 to determine whether it may fetch the data for processing, at 912. A discussion of how the processor identifies the data is described with reference to FIG. 11 below. Once the data has been identified for processing by the processor PN, the data is fetched for processing at 914. At 916, the processor PN begins to process the data. Processing of the data includes, for example, the processor PN manipulating the data to produce a meaningful output by sorting, searching, validating, matching, aggregating, reporting, classifying, analyzing, summarizing, calculating, graphing, etc., and as described more thoroughly above with reference to FIG. 3. When processing completes, at 920, the processed data is marked to indicate completion, as explained with reference to FIG. 9. For example, as illustrated in FIGS. 6A and 6B, when data processing is completed, the processor PN generates a unique identifier (FIG. 6B) and random value (FIG. 6A) of "FFFFFDSDFFFBD88209AF131925" and status indicator (FIG. 6A) of "COMPLETED". Otherwise, processing continues until completion or the processor PN releases the data from processing (not illustrated). Data may be released by a processor for a variety of reasons. For example, if the processor PN is interrupted, fails, is scheduled for completion at a later time, etc. If data is released by a processor PN, another processor may be granted access to complete processing after a pre-set amount of time or based on some other predetermined threshold. If such a threshold is not met, then the data being processed by processor PN will be inaccessible to all other processors until completion of processing (920).

Figure 11:
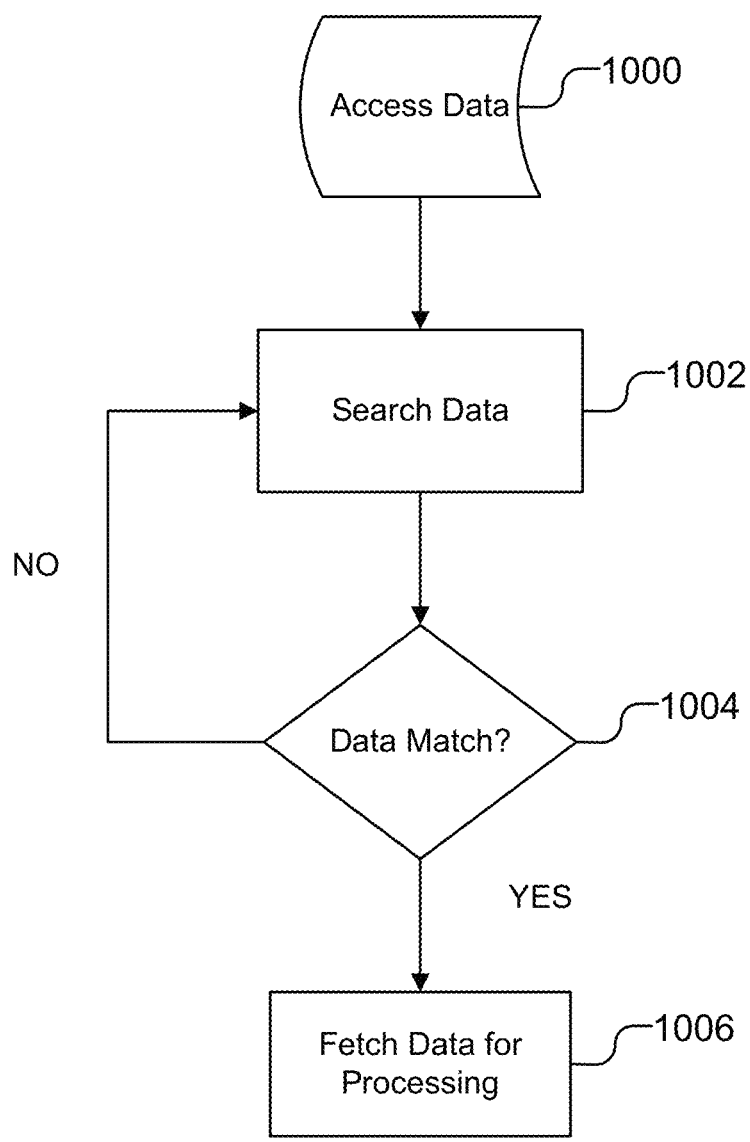
FIG. 11 is an exemplary flowchart of matching data from the common data source.

FIG. 11 is an exemplary flowchart of matching data from the common data source. Once data has been accessed at 1000, the common data source D1 is searched to identify (912) a marking in the stored data that matches data generated by the processor PN, at 1002. Searching of data includes searching data and/or subsets of data to find a unique identifier (FIG. 6B) or a random value (FIG. 6A) that matches a unique identifier or random value that was earlier generated by the processor PN, as explained for example with reference to FIG. 9. In particular, when the randomly generated value, such as "FFFFFDSDFFFBD88209AF131925", is equal to (1004) the random value, such as "FFFFFDSDFFFBD88209AF131925", stored in the data (or subset of data), then the processor determines that a match has been identified and the data is fetched for processing from the common data source D1 (1006). If, on the other hand, the randomly generated value, such as "FFFFFDSDFFFBD88209AF131925", does not equal the random value, such as "1037465CCCFRXX8394FFF12345", then the processor determines that no match has been made and continues to search the data for a match at 1002.

As a result of the system and method depicted in the various figures, parallel processing of data in a distributed computing environment may be accomplished in a time-efficient manner and without requiring use of several conventional methodologies. In particular, using the marking of data, the system is able to identify data for processing by a particular processor or processing entity without having to search all of the data stored in the common data source. Accordingly, the search time required to identify the data for processing is reduced, and processors process data that has been identified for processing by a processor that may be particularly well suited for the task. For example, the system and method of the instant disclosure do not require a job scheduler or queue to allocate resources for processing of data. Rather, designated processors or processing entities are allocated or assigned a specific set or subset of data for processing. Moreover, there is no dependency on a database locking mechanism. That is, there is no need to "lock" and "unlock" the data while data is being fetched and updated. A database locking mechanism approach requires the processor or processing entity to persist the database connection until processing has been completed. Thus, if a processor or processing entity stops working, the data remains in an inaccessible and locked state until a predetermined amount of time passes. In the instant disclosure, if a processor or processing entity stops working, the data may be processed by another processor or processing entity without significant delay. Other advantages include that data in the data source to be marked for a specific processor or processing entity can be configured for the specific processor or processing entity, the data may be implemented with any data source which provides write atomicity (no dependency on the version/type of database), and the data may be stored for processing using one or multiple data sources.

In one embodiment, there is a method of distributing processing jobs to multiple processing nodes of a distributed parallel processing system, including accessing subsets of data from a data set stored in a common storage system by a respective one of the processing nodes; generating unique identifiers for each of the subsets of data, the unique identifiers generated by the respective one of the processing nodes having accessed the respective subset of data, the unique identifiers do not identify any of the multiple processing nodes; marking each of the subsets of data with a respective one of the unique identifiers by a respective one of the processing nodes, the marked subsets of data provided to the common storage system for updating the respective subsets of data; and individually identifying the updated subsets of data to be processed by the respective one of the processing nodes by matching the unique identifiers in the updated subsets of data to the unique identifiers in the marked subsets of data generated by a respective one of the processing nodes, such that each of the respective processing nodes having successfully matched the unique identifiers performs distributed parallel processing jobs on the subsets of data.

In another embodiment, there is an apparatus to distribute and process data in a distributed and parallel processing environment, including a common data source to store a dataset for parallel processing; a plurality of processing entities configured to receive different portions of the data set from the common data source for parallel processing in order to perform parallel jobs on the different portions of the dataset; and a first processing entity of the processing entities configured to receive a first portion of the dataset, the first processing entity configured to generate a first distinct identifier and a first status indicator, the first processing entity configured to mark the first portion of the dataset with the first distinct identifier and the first status indicator, the first processing entity configured to provide the marked first portion of the dataset to the common data source for updating the first portion of the dataset to reflect the marking added thereto, the first processing entity configured to identify the updated first portion of the dataset stored in the common data source by comparing the marking to the generated first distinct identifier and first status indicator, and the first distinct identifier not identifying any of the processing entities, the first processing entity configured to process the updated first portion of the dataset by the first processing entity when the generated first distinct identifier and first status indicator respectively match the first distinct identifier and first status indicator of the updated first portion of the dataset reflecting the marking such that no other of the processing entities processes the same updated first portion of the dataset at the same time.

In still another embodiment, there is a computer program product, including a computer readable storage medium having computer readable program code embodied therewith, the computer readable program code comprising: computer readable program code configured to generate a unique identifier for a subset of data stored in a common storage, the unique identifier generated by a first of multiple processors having previously accessed the subset of data, the unique identifier does not identify any of the multiple processors including the first processor; computer readable program code configured to mark the subset of data with the unique identifier, the marked subset of data provided to the common storage for updating the subset of data; computer readable program code configured to identify the updated subset of data to be processed by the first processor by matching the unique identifier in the updated subset of data to the unique identifier in the marked subset of data generated by the first processor; and computer read able program code configured to fetch the updated subset of data by the first processor when the unique identifiers have been successfully matched, such that the first processor having successfully matched the unique identifiers performs distributed parallel processing jobs on the subset of data.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of distributing processing jobs to multiple processing nodes of a distributed parallel processing system, comprising:

accessing subsets of data from a data set stored in a common storage system by a respective one of the processing nodes;

generating unique identifiers for each of the subsets of data, the unique identifiers generated by the respective one of the processing nodes having accessed the respective subset of data, the unique identifiers do not identify any of the multiple processing nodes;

marking each of the subsets of data with the respective one of the unique identifiers by the respective one of the processing nodes, the marked subsets of data provided to the common storage system for updating the respective subsets of data and the respective one of the unique identifiers preventing other processing nodes from accessing the respective subset of data from the common storage system during processing; and individually identifying the updated subsets of data to be processed by the respective one of the processing nodes by matching the unique identifiers in the updated subsets of data to the unique identifiers in the marked subsets of data stored in the common storage system and generated by the respective one of the processing nodes, wherein the unique identifier is a random value that authenticates the marking in the subsets of data and wherein each of the respective processing nodes having successfully matched the unique identifiers performs distributed parallel processing jobs on the subsets of data.

2. The method of claim 1, further comprising:

fetching the updated subsets of data by each of the respective processing nodes when the unique identifiers have been successfully matched;

processing the updated subsets of data by each of the respective processing nodes until completion of processing or release of the updated subsets of data; and releasing the updated subsets of data by each of the respective processing nodes when the unique identifier in the updated subsets of data respectively fail to match the unique identifier of the marked subsets of data generated by the respective one of the processing nodes, such that another one of the processing nodes may process the updated subsets of data.

3. The method of claim 2, further comprising:

updating the unique identifier in the updated subsets of data to indicate completion of the processing when processing of the updated subsets of data has been completed, and otherwise updating the unique identifier to indicate a current status of processing by the respective one of the processing nodes.

4. The method of claim 2, wherein the common storage system is one of a server, database, data repository, memory, storage, data source and datastore.

5. The method of claim 2, wherein, after a predetermined amount of time of inactivity by the one processing node, the subset of data is released to the another one of the processing nodes for processing.

6. The method of claim 1, wherein the processing nodes are each a processor, processing entity or any combination thereof.

7. The method of claim 1, wherein the individually identifying the updated subsets of data comprises:

searching the subsets of data in the common storage system until the unique identifiers have been matched, and after identifying the matching unique identifiers, fetching the subsets of data for processing by the respective one of the processing nodes, the unique identifier is a random value generated by one of the processing nodes.

8. The method of claim 1, wherein each subset of data stored in the common storage system is formatted as a table of data including rows and columns with one column added to each row including the unique identifier.

9. The method of claim 1, wherein the common storage system has atomic characteristics.

10. The method of claim 1, wherein the generated unique identifier is an attribute indicative of a type of data of the subset of data, such that the one processing node processes the subset of data when the attribute matches an attribute of the one processing node indicative of a type of data processing.

11. An apparatus to distribute and process data in a distributed and parallel processing environment, comprising:

a common data source to store a dataset for parallel processing;

a plurality of processing entities, including one or more processors, configured to receive different portions of the data set from the common data source for parallel processing in order to perform parallel jobs on the different portions of the dataset; and a first processing entity of the processing entities configured to receive a first portion of the dataset, the first processing entity configured to generate a first distinct identifier and a first status indicator, the first processing entity configured to mark the first portion of the dataset with the first distinct identifier and the first status indicator, the first processing entity configured to provide the marked first portion of the dataset to the common data source for updating the first portion of the dataset to reflect the marking added to the first portion of the dataset, the first processing entity configured to identify the updated first portion of the dataset stored in the common data source by comparing the marking to the generated first distinct identifier and the first status indicator, wherein the first identifier is a random value to authenticate the marking in the updated first portion of the dataset, and the first distinct identifier not identifying any of the processing entities, the first processing entity configured to process the updated first portion of the dataset by the first processing entity when the generated first distinct identifier and the first status indicator stored in the common data source respectively match the first distinct identifier and the first status indicator of the updated first portion of the dataset reflecting the marking such that no other of the processing entities processes the same updated first portion of the dataset at the same time.

12. The apparatus of claim 11, the first processing entity configured to fetch the updated first portion of the dataset identified as having been successfully matched;

the first processing entity configured to process the updated first portion of the dataset until completion of processing or release of the portion of the dataset; and the first processing entity configured to release the updated first portion of the dataset when the generated first distinct identifier and the first status indicator respectively fail to match the first distinct identifier and the first status indicator of the updated first portion of the dataset reflecting the marking, such that another of the processing entities processes the updated first portion of the dataset.

13. The apparatus of claim 12, the first processing entity configured to update the first status indicator in the updated portion of the dataset to indicate completion of the processing when processing has been completed, and otherwise updating the status indicator to indicate a current status of processing.

14. The apparatus of claim 12, wherein, after a predetermined amount of time of inactivity by the first processing entity, the first portion of the dataset is released to the another processing entity for processing.

15. The apparatus of claim 11, wherein the first processing entity is a processor, processing center or any combination thereof.

16. The apparatus of claim 11, wherein the first portion of the dataset stored in the common data source is formatted as a table of data including rows and columns with a first column added to each row including the random value and a second column added to each row including the first status indicator.

17. The apparatus of claim 11, wherein the common data source is one of a server, database, data repository, memory, storage, storage system and datastore.

18. The apparatus of claim 11, wherein the common data source has atomic characteristics.

19. The apparatus of claim 11, wherein the generated first distinct identifier is an attribute reflecting a type of the first portion of data, such that the first processing entity processes the first portion of dataset when the attribute matches an attribute of the first processing entity.

20. A computer program product, comprising:

a non-transitory computer readable storage device having computer readable program code embodied therewith, the computer readable program code comprising:

computer readable program code configured to generate a unique identifier for a subset of data stored in a common storage, the unique identifier generated by a first of multiple processors having previously accessed the subset of data, the unique identifier does not identify any of the multiple processors including the first processor;

computer readable program code configured to mark the subset of data with the unique identifier, the marked subset of data provided to the common storage for updating the subset of data;

computer readable program code configured to identify the updated subset of data to be processed by the first processor by matching the unique identifier in the updated subset of data to the unique identifier in the marked subset of data generated by the first processor, wherein the unique identifier is a random value generated by the first processor for marking the updated subset of data, and the random value authenticates the marking in the updated subset of data as having been generated by the first processor; and computer readable program code configured to fetch the updated subset of data by the first processor when the unique identifiers stored in the common storage have been successfully matched, such that the first processor having successfully matched the unique identifiers performs distributed parallel processing jobs on the subset of data.

21. The computer program product of claim 20, further comprising:

computer readable program code configured to release the updated subset of data by the first processor when the unique identifier in the updated subset of data fails to match the unique identifier of the marked subset of data generated by the first processor, such that another one of the processors may process the updated subset of data.

22. The computer program product of claim 21, further comprising:

computer readable program code configured to update the unique identifier in the updated subset of data to indicate completion of the processing when processing of the updated subset of data has been completed, and otherwise updating the unique identifier to indicate a current status of processing by the first processor.

* * * * *